US007263412B2

(12) United States Patent
Gutmann et al.

(10) Patent No.: US 7,263,412 B2
(45) Date of Patent: Aug. 28, 2007

(54) ROBOT SELF-POSITION IDENTIFICATION SYSTEM AND SELF-POSITION IDENTIFICATION METHOD

(75) Inventors: Steffen Gutmann, Tokyo (JP); Masaki Fukuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 605 days.

(21) Appl. No.: 10/470,456

(22) PCT Filed: Nov. 27, 2002

(86) PCT No.: PCT/JP02/12367

§ 371 (c)(1),
(2), (4) Date: Jan. 13, 2004

(87) PCT Pub. No.: WO03/046478

PCT Pub. Date: Jun. 5, 2003

(65) Prior Publication Data

US 2004/0249504 A1    Dec. 9, 2004

(30) Foreign Application Priority Data

Nov. 30, 2001   (JP) .............................. 2001-365752

(51) Int. Cl.
*G06F 19/00*   (2006.01)

(52) U.S. Cl. .................. 700/245; 700/246; 700/254; 700/261; 700/262; 318/568.12; 701/23; 701/25; 701/28; 901/1; 901/2

(58) Field of Classification Search ................. 700/245
See application file for complete search history.

(56) References Cited

U.S. PATENT DOCUMENTS 6,108,597 A * 8/2000 Kirchner et al. .............. 701/23

(Continued)

FOREIGN PATENT DOCUMENTS

JP       6-201813       7/1994

(Continued)

OTHER PUBLICATIONS

Shimizuhira et al., Self-Localization method used multiple omnidirectional vision system, 2003, IEEE, p. 324-327.*

(Continued)

*Primary Examiner*—Thomas Black
*Assistant Examiner*—McDieunel Marc
(74) *Attorney, Agent, or Firm*—Frommer Lawrence & Haug LLP; William S. Frommer (57) ABSTRACT

A self-localization system uses both of a global search apparatus, which is based on grid-based Markov localization, and a local search apparatus, which uses an extended Kalman filter. If an observation result by the global search apparatus is valid, then updating of an observation result by the local search apparatus is permitted, but if the observation result is not valid, then updating of the observation result by the local search apparatus is not performed. On the other hand, if the observation result by the local search apparatus is valid, then a state of the local search is outputted, but if the observation result is not valid, then the local search apparatus is re-initialized. Accordingly, the self-localization of a robot can be performed based on sensor information of the robot and motion information performed by the robot in an environment including artificial landmarks.

19 Claims, 7 Drawing Sheets

U.S. PATENT DOCUMENTS 6,917,855 B2 * 7/2005 Gonzalez-Banos et al. . 700/245
2004/0062419 A1 * 4/2004 Roh et al. .................... 382/104

FOREIGN PATENT DOCUMENTS

JP 7-182301 7/1995
JP 7-182601 7/1995

OTHER PUBLICATIONS

Yoshioka et al., A gross sensor-based navigation algorithm for a mobile robot with self-positioning, sensing, control erros, 1996, IEEE, p. 778-783.*

Takiguchi et al., A study of autonomous mobile systm in outdoor environment, 2001, IEEE, p. 1117-1123.*

An et al., Improvemetn of convergence to goal for wheeled mobile robot using parking motion, 1999, IEEE, p. 1693-1698.*

Moon et al. On-line Selection of Stable Visual Landmarks under Uncertainty. In: Proc. 1999 IEEE/RSJ Int. Conf. on Intelligent Robots and Systems, 1999, p. 781-786.

Fox et al. Markov Localization for Mobile Robots in Dynamic Environments In: Journal of Artificial Intelligence Research, 1999, vol. 11, pp. 391-427.

Gutmann J-S et al: "An experimental comparison of localization methods" Intelligent Robots and Systems, 1998. Proceedings., 1998 IEEE/RSJ International Conference on Victoria. BC, Canada Oct. 13-17, 1998, New York, NY, USA, IEEE, US, Oct. 13, 1998, pp. 736-743, XP010311481 ISBN: 0-7803-4465-0.

Sylvie Thiebaux et al., "Combining Kalman Filtering and Markov Localization in Network-Like Environments", CSIRO Mathematical & Information Sciences, 2000, pp. 756-766.

Dieter Fox et al., "Markov Localization for Mobile Robots in Dynamic Environments", Journal of Artificial Intellegence Research, vol. 11, 1999, pp. 391-427.

* cited by examiner

ROBOT SELF-POSITION IDENTIFICATION SYSTEM AND SELF-POSITION IDENTIFICATION METHOD

TECHNICAL FIELD

This invention relates a self-localization system and a self-localization method for an intelligent traveling robot, which can travel freely (along no particular route) in a working space, and more particularly to a self-localization system and a self-localization method for a robot by which the self-localization of the robot is performed based on sensor information of the robot and movement information of the robot itself.

More specifically, the present invention relates to a self-localization system and a self-localization method for a robot by which the self-localization of the robot is performed using a result of a search of a landmark in an environment including an artificial landmark as a clue, and particularly to a self-localization system and a self-localization method for a robot by which self-localization is performed using both of a global search wherein a search is performed in comparatively short search time over a wide range and a local search wherein long search time is required although the accuracy is high.

BACKGROUND ART

A mechanical apparatus, which performs a movement similar to a motion of a human using electric or magnetic action, is called "robot". It is said that the term robot originates from a Slav word ROBOTA (slave machine). In our country, the robot began to be popularized in the end of the 1960s. However, most of the robots were industrial robots such as manipulators and transporting robots intended to achieve automation and unmanning of manufacturing works in factories.

Recently, research and development have proceeded regarding various types of traveling robots of the leg type beginning with "human-shaped" or humanoid robot designed by modeling body mechanisms and motions of an animal, which walks erectly with two legs like a human, and also expectations for achievement of practical use of them are increasing.

Principal applications of traveling robots having wheels or movable legs involve vicarious execution of various works in industrial activities or productive activities and co-existence or symbiosis with humans who act intelligently on the basis of a conversion with a user. The former signifies that a robot performs a critical work or a difficult work at a site into which a human cannot step readily such as a maintenance work in a nuclear power plant, a heat power plant, or a petrochemical plant, a transporting or assembling work of parts in a manufacturing factory, cleaning of a high-rise building, or rescue at a fire site or a like place. Meanwhile, in the latter case, the robot is utilized in a free space same as that of a human and effects autonomous thinking and motion control to implement higher and more realistic communication.

Incidentally, self-localization of a traveling robot is a technique very significant for allowing a robot to perform a service such as, for example, a delivery service. This is because it is inefficient that a traveling robot takes a wrong route to a destination even if it can restore a correct route. There is the possibility even that such a hazard as collision with an obstacle or advancement into a dangerous zone may be invited.

One of representative techniques for allowing a robot to perform self-localization is utilization of a "Landmark". A landmark usually has visually identifiable visibility information formed on a surface thereof. A robot can geographically search the self-localization based on relative position information from the visually recognized landmark.

A system, which applies, for example, Markov localization or an extended Kalman filter, has been proposed as a searching or self-localization system in an environment including an artificial landmark.

A searching apparatus using the Markov localization stores the self-localization in an environment as a self-localization probability density distribution on discrete grids and estimates, if it observes a landmark set in the environment, the self-localization based on a relative position from the landmark to update the self-localization probability density distribution. Further, if the searching apparatus observes motion information of the searching apparatus itself, then it updates the self-localization probability density based on the motion information. Then, that one of the grids that has the highest value of the self-localization probability density distribution at each time is determined as an estimation result of the self-localization.

On the other hand, a searching apparatus using an extended Kalman filter stores the self-localization as actually measured values of state variables [x, y, θ]. Then, if the searching apparatus observes a landmark set in an environment, then it estimates the self-localization based on the relative position from the landmark. Further, if the searching apparatus observes motion information of the searching apparatus itself, then it estimates a state amount based on the motion information.

The former searching apparatus applying the Markov localization is characterized principally in that, although the accuracy of an identification solution is rough, the convergence speed of the solution is high. Therefore, the inventors of the present invention consider that a searching apparatus of the type described is suitable for a global search. Further, the Markov localization is robust against noise of a sensor. In other words, even if a sensor value includes noise, a substantially fixed self-localization result can be obtained with the Markov localization.

Meanwhile, the latter searching apparatus applying an extended Kalman filter is characterized principally in that, although the convergence speed of a solution is low, the accuracy of the identification solution is fine. Therefore, the inventors of the present invention consider that a searching apparatus of the type just described is suitable for a local search. Further, although the extended Kalman filter is robust against sensor information, it is poor in robustness against sensor noise and requires a long period of time for resetting.

A searching apparatus using the Markov localization exhibits considerable characters of a global searching apparatus and is low in the convergence speed of a solution. However, since the amount of calculation increases in proportion to the square of the number of grid divisions, the accuracy of the identification solution relies upon the roughness of the discrete grids and usually a solution having a high accuracy is not obtained. Further, where the accuracy of the solution is poor, the self-localization cannot be found accurately. This sometimes gives rise to such a trouble that the destination cannot be reached accurately or it cannot be discriminated whether or not the destination is reached actually.

On the other hand, a searching apparatus using an extended Kalman filter exhibits considerable characters of a local searching apparatus and is very high in the accuracy of an identification solution. However, the searching apparatus is low in the convergence performance and lacks in robustness (toughness) against noise of observation information. Where the convergence speed is low, much time is required for initial localization upon starting of self-localization, and, if the position is moved unintentionally by external force (an abduction or kidnapping problem), then very much time is required before a correct solution is obtained.

DISCLOSURE OF INVENTION

It is an object of the present invention to provide a superior self-localization system and self-localization method for a robot by which high-speed and robust self-localization with a high degree of accuracy can be performed for the robot, which includes a moving mechanism such as wheels or movable legs and behaves while it recognizes the position or the posture of the robot itself.

It is another object of the present invention is to provide a superior self-localization system and self-localization method for a robot by which the self-localization can be suitably performed by using a result of a search of a landmark in an environment including an artificial landmark as a clue.

It is a further object of the present invention to provide a superior self-localization system and self-localization method for a robot by that both of a global search, which searches in a comparatively short period of search time over a wide range, and a local search, which requires much search time although the search accuracy is high, can be used to achieve high-speed and robust self-localization with a high degree of accuracy.

The present invention has been made in view of the subjects described above, and there is provided a self-localization system or a self-localization method for a robot which includes a moving mechanism and can travel in an environment including:

an external observation means for or step of observing a landmark provided in the environment;

an internal observation means for or step of observing motion information of the robot;

a first search means for or step of outputting a localization solution at a comparatively high speed based on a result of the external observation and a result of the internal observation;

a second search means for or step of outputting a localization solution with a comparatively fine accuracy based on the external observation result and the internal observation result; and a control means for or step of controlling the operation of the second search means in response to the output result of the first search means.

Here, the first search means or step may apply Markov localization to store the position of the robot in the environment as a self-localization probability density distribution on discrete grids, and estimate the self-localization based on a relative position of the robot from the landmark in response to the observation result of the landmark by the external observation means to update the self-localization probability density distribution, update the self-localization probability density based on the observation result of the motion information of the robot by the internal observation means, and output that one of the grids which has the highest value of the self-localization probability density distribution at each time as an estimation result of the self-localization.

A search that applies the Markov localization, is characterized principally in that it is robust against sensor noise and the convergence speed of the solution is high although the accuracy of an identification solution is rough, and is suitable for a global search.

Meanwhile, the second search means or step may apply an extended Kalman filter including a state model, which defines a relationship between the motion information of the robot by the internal observation means and the self-localization, and an observation model, which defines a relationship between the self-localization and the observation information of the landmark by the external observation means, to estimate the self-localization based on the motion information of the robot by the internal observation means and the observation information of the landmark by the external observation means.

A search that applies the extended Kalman filter is characterized principally in that it is superior in the robustness against a decrease of sensor information and is fine in the accuracy of the identification solution although it is poor in the robustness against sensor noise and is low in the convergence speed of a solution, and is suitable for a local search.

The control means or step may evaluate the validity of the external observation result by the external observation means based on the search result by the first search means and limit inputting the external observation result to the second search means in response to a fact that the evaluation does not satisfy a predetermined reference.

For example, where the Markov localization is applied in the first search means or step, the validity of the external observation result by the external observation means or step may be evaluated depending upon whether or not the probability with which the landmark is observed by the external observation means or step at the self-localization estimated by the first search means or step exceeds a predetermined threshold value.

For example, if the probability with which the landmark is observed at the estimated self-localization is lower than the threshold value, then it is predicted that the solution does not exhibit sufficient convergence due to sensor noise. Accordingly, even if a search is performed based on the extended Kalman filter section, which is poorer in the robustness against sensor noise, a self-localization result having a high accuracy cannot be obtained. Therefore, inputting the external observation result to the second search means or step may be limited in response to a fact that the evaluation does not satisfy a predetermined reference to skip the search based on the extended Kalman filter whose convergence speed is low.

Alternatively, the control means may verify the validity of the search result by the second search means and output the search result as the self-localization result in response to a fact that the evaluation satisfies a predetermined reference, but re-initialize the second search means in response to another fact that the evaluation does not satisfy the predetermined reference.

For example, where the extended Kalman filter is applied in the second search means or step, the probability density distribution that is the estimation result of the self-localization by the second search means or step may be compared with the probability density distribution that is the estimation result of the self-localization by the first search means or step to verify the validity based on the similarity between them. For example, a chi-square test can be utilized as the similarity of the distributions. Since the Markov localization is more robust against sensor noise than the extended Kalman filter, if the two probability density distributions are not similar to each other, then it is estimated that the search result based on the extended Kalman filter, which is lower in the robustness against sensor noise, is not valid. Further, the extended Kalman filter requires longer time for resetting. Therefore, the second search means or step may be re-initialized in response to a fact that the evaluation does not satisfy a predetermined reference.

Further, since a search based on the extended Kalman filter is higher in the robustness against a decrease of sensor information, where the evaluation satisfies the predetermined reference, the self-localization estimation result by the second search means or step may be outputted as a search result of the entire system.

With the self-localization system and the self-localization method according to the present invention, there is no necessity to rely only upon an identification solution of a rough accuracy by a global search, which is superior in the convergence speed of a self-localization solution, and besides there is no necessity to normally operate a local search, which is high in the accuracy of an identification solution but is low in the convergence speed, and wait an output of a result of the local search.

Further, the robustness of the Markov localization against sensor noise may be utilized to evaluate the validity of the external observation result regarding the landmark and/or the validity of the self-localization estimation result of the extended Kalman filter and finally output the self-localization estimation result by the extended Kalman filter, which is superior in the robustness against a decrease of sensor information, as the self-localization result of the entire system.

In other words, according to the present invention, high-speed and robust self-localization of a high degree of accuracy can be achieved.

It is to be noted that the external observation means may include image inputting means for capturing the landmark and image recognition means for recognizing the landmark and the distance to the landmark based on an input image from the image inputting means.

Alternatively, the external observation means may include a range finder or a like element for measuring the distance to the landmark.

The landmark may be formed from a member having visually discernible identification information formed on a surface thereof. For example, a tubular pole painted with two or more colors, a flat plate painted with two or more colors or a like member may be applied.

The above and other objects, features, and advantages of the present invention will become apparent from the detailed description based on an embodiment of the present invention hereinafter described and the accompanying drawings.

BEST MODE FOR CARRYING OUT THE INVENTION

In the following, an embodiment of the present invention is described with reference to the drawings.

A. Configuration of the Traveling Robot

Figure 1:
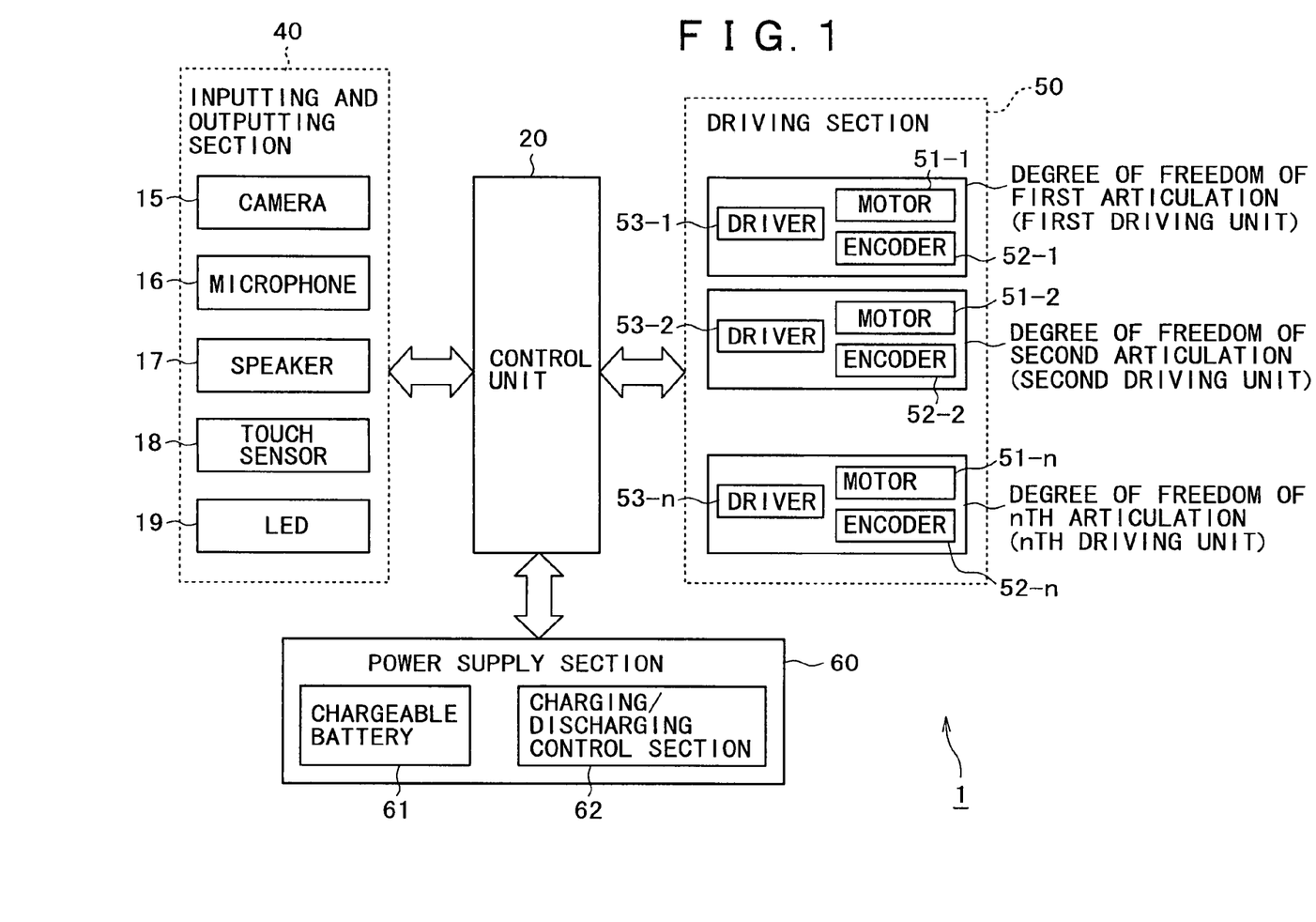
FIG. 1 is a view schematically showing a functional configuration of a traveling robot 1 used in carrying out the present invention.

FIG. 1 schematically shows a functional configuration of a traveling robot 1 used in carrying out the present invention. Referring to FIG. 1, the traveling robot 1 includes a control unit 20, which performs supervisory control of operation of the entire traveling robot 1 and other data processing, an inputting and outputting section 40, a driving section 50, and a power supply section 60. In the following, the components are described.

The inputting and outputting section 40 includes, as inputting elements, a CCD camera 15, which corresponds to the eye of the traveling robot 1, a microphone 16, which corresponds to the ear, a touch sensor 18 disposed at such a location as the head or the back for sensing a touch of a user, pad switches disposed on the soles, and other various sensors corresponding to the five senses. The inputting and outputting section 40 includes, as outputting elements, a speaker 17, which corresponds to the mouth, an LED indicator (eye lamp) 19, which uses a combination of flickering or a timing of lighting to form an expression of the face, and other suitable elements. The outputting elements can represent a user feedback from the traveling robot 1 in a form other than mechanical movement patterns by the legs and so forth.

The CCD camera 15 can function as external observation means for observing, for example, a landmark disposed at any location in a working space. Naturally, the traveling robot 1 may include a range finder or a like element as external observation means except (or together with) the CCD camera 15.

The driving section 50 is a functional block implementing mechanical movements of the traveling robot 1 in accordance with a predetermined movement pattern commanded by the control unit 20 and includes driving units provided for individual shafts for rolling, pitching, and yawing movements of articulations such as a neck articulation 7, a tail articulation 8, hip joints 11A to 11D, and knee joints 12A to 12D. In the example shown, the traveling robot 1 has n degrees of freedom, and accordingly, the driving section 50 includes n driving units. Each of the driving units includes a combination of a motor 51 for performing rotational motion around a predetermined axis, an encoder 52 for detecting the rotational position of the motor 51, and a driver 53 for adaptively controlling the rotational position and/or the rotational speed of the motor 51 based on an output of the encoder 52.

The encoder 52 disposed for each of the driving units can function as internal observation means for observing motion information of the robot itself.

The power supply section 60 is a functional module for feeding electric circuits and other electric elements in the traveling robot 1 as can be recognized from the term. The traveling robot 1 according to the present embodiment is of the autonomous driving type using a battery, and the power supply section 60 includes a chargeable battery 61 and a charging/discharging control section 62 for managing the charging/discharging state of the chargeable battery 61.

The chargeable battery 61 is formed as a "battery pack" that includes, for example, a package of a plurality of nickel-cadmium battery cells like a cartridge.

The charging/discharging control section 62 measures the terminal voltage and/or the charging/discharging current amount or amounts of the chargeable battery 61 or the ambient temperature and so forth of the battery 61 to grasp the remaining capacity of the battery 61 to determine the starting timing or the ending timing of charging. The charging starting and ending timings determined by the charging/discharging control section 62 are conveyed to the control unit 20 and used to make triggers for the traveling robot 1 to start and end the charging operation.

The control unit 20 corresponds to the "brain" and is installed, for example, in the head or the body of the traveling robot 1.

Figure 2:
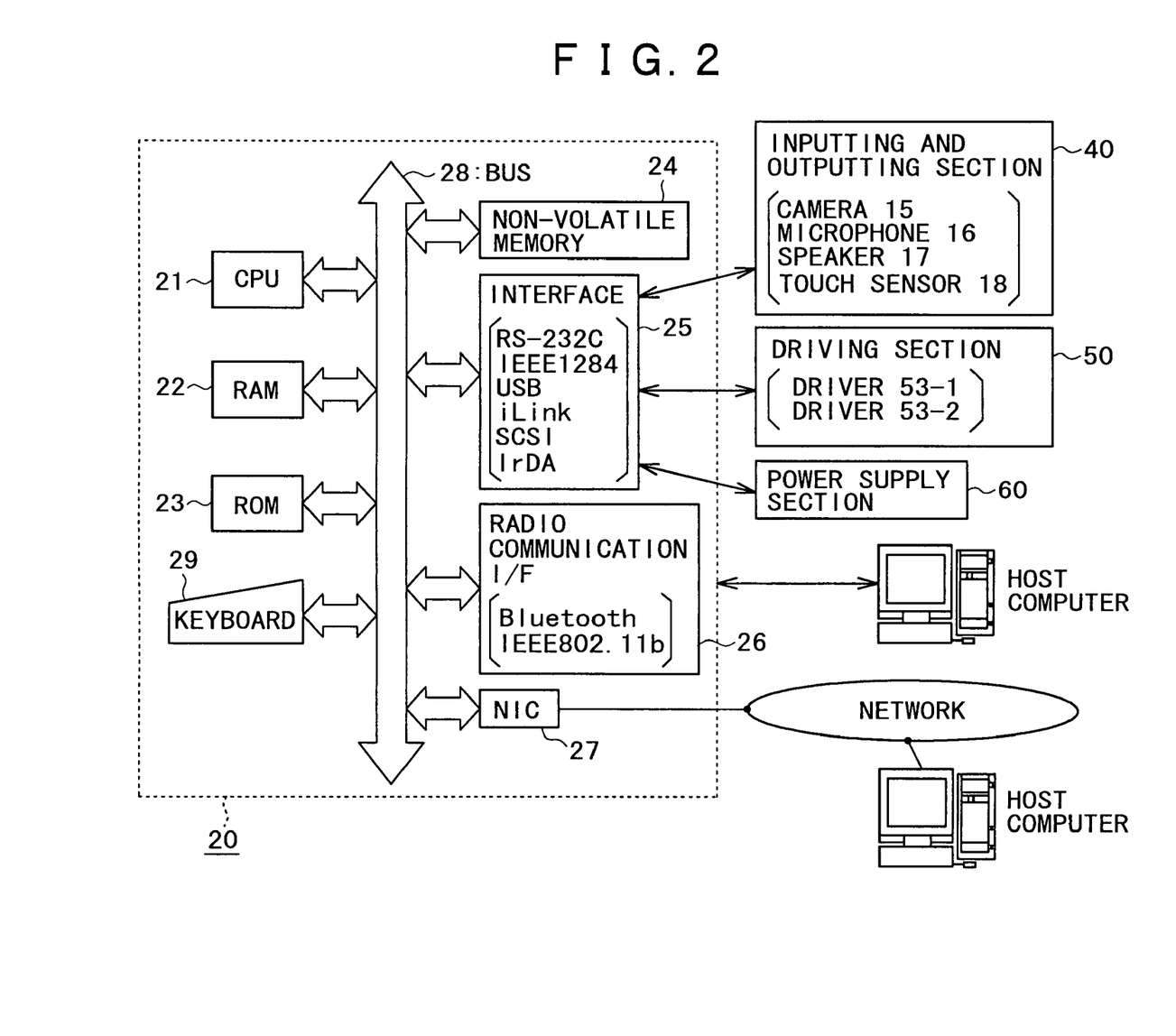
FIG. 2 is a view showing a configuration of a control unit 20 more particularly.

FIG. 2 illustrates the configuration of the control unit 20 more particularly. As shown in FIG. 2, the control unit 20 is configured such that a CPU (Central Processing Unit) 21 as a main controller is connected to memories, other circuit components, and peripheral equipments by a bus. The bus 27 is a common signal transmission line including a data bus, an address bus, a control bus, and other necessary buses. Each of the apparatus on the bus 27 has a unique address (memory address or I/O address) allocated thereto. The CPU 21 can communicate with a particular one of the apparatus on the bus 28 by designating the address of the apparatus.

The RAM (Random Access Memory) 22 is a writable memory formed from a volatile memory such as a DRAM (Dynamic RAM) and is used to load program codes to be executed by the CPU 21 or to temporarily store work data by an executed program.

The ROM (Read Only Memory) 23 is a read only memory in which programs and data are permanently stored. Program codes stored in the ROM 23 include a self-diagnosis test program to be executed upon connection of the power supply to the traveling robot 1 and a motion control program for defining motions of the traveling robot 1.

Control programs of the traveling robot 1 include a "sensor input processing program" for processing a sensor input of the CCD camera 15, the microphone 16, or a like element, a "behavior instruction program" for producing a behavior or movement pattern of the traveling robot 1 based on sensor inputs and a predetermined movement model, a "driving control program" for controlling driving of the motors, a sound output of the speaker 17, and so forth in accordance with the movement pattern thus produced, and a "self-localization program" for searching a geographical location of the traveling robot 1 itself using more than one landmark disposed in the working space as a clue.

The driving control program may be configured so as to present motions having a high degree of entertainment property such as "hand", "wait", "sit down", and utterance of howling of an animal such as "bow-wow" in addition to an ordinary walking movement or running movement.

The self-localization program performs global and local self-localization processes based on external observation information such as a landmark observed by the CCD camera 15 and motion information of the traveling robot 1 itself observed by the encoder 52. Details of a mechanism of the self-localization are hereinafter described.

The non-volatile memory 24 is formed from a memory element allowing electrical erasure and rewriting such as, for example, an EEPROM (Electrically Erasable and Programmable ROM) and is used to store data, which are to be updated successively, in a nonvolatile fashion. The data to be successively updated include a production number and security information such as a cryptographic key.

The interface 25 is an apparatus for connecting the control unit 20 and external apparatus to each other to allow data exchange between them. The interface 25 inputs and outputs data to and from, for example, the CCD camera 15, microphone 16, and speaker 17. The interface 25 further inputs and outputs data and commands to and from the drivers 53-1, . . . in the driving section 50.

Further, the interface 25 may include a general purpose interface for connection to a peripheral equipment of a computer such as a serial interface such as an RS (Recommended Standard)-232C, a parallel interface such as an IEEE (Institute of Electrical and Electronics Engineers) 1284, a USB (Universal Serial Bus) interface, and i-Link (IEEE 1394) interface, a SCSI (Small Computer System Interface) interface, or a memory card interface (card slot) for accepting a memory stick, and perform transfer of a program or data to or from a locally connected external equipment.

As another example of the interface 25, it may include an infrared communication (IrDA) interface and perform radio communication with an external apparatus.

Further, the control unit 20 includes a radio communication interface 26, a network interface card (NIC) 27, and other required elements. The control unit 20 can perform data communication with various external host computers through proximity radio data communication such as the Bluetooth, a radio network such as an IEEE 802.11b network, or a wide area network such as the Internet.

By such data communication between the traveling robot 1 and a host computer as described above, it is possible to use a computer resource at a remote place to arithmetically operate complicated motion control of the traveling robot 1 or remotely control the traveling robot 1.

B. Robot Self-Localization System

The traveling robot 1 according to the present embodiment includes a self-localization system for searching a location of the traveling robot 1 at present in the working space within which the traveling robot 1 itself moves autonomously. The self-localization system is actually implemented by program codes executed by the CPU 21 in the control unit 20.

The self-localization system according to the present embodiment is based on observation of more than one landmark disposed in the working space. The system performs a searching process based on an external observation result regarding observation of the landmarks and an internal observation result regarding observation of motion information of the traveling robot 1 itself. In particular, the traveling robot 1 determines the state of the traveling robot 1, that is a likelihood of the self-localization 1, based on a history of an external observation result s of sensor inputs and so forth and a history of an internal observation result a of encoder outputs of the articulation actuators. Although it is very difficult to integrally couple effects of the external observation result and the internal observation result, it is possible to recursively estimate an estimated value or the probability.

Further, the self-localization system according to the present embodiment employs both of a "global search", which is rough in the accuracy of an identification solution but is high in the convergence speed of a solution and a "local search", which is low in the convergence speed of a solution but is fine in the accuracy of an identification solution. The Markov localization is applied to the global search while an extended Kalman filter is applied to the local search.

In the search using the Markov localization, the traveling robot 1 stores the position of the traveling robot 1 itself in the working space as a self-localization probability density distribution on discrete grids, and if it observes a landmark positioned in the working space, then it estimates the self-localization thereof based on the observation information "s" of the landmark, that is, a relative position thereof from the landmark and updates the self-localization probability density distribution. Further, if the traveling robot 1 observes the motion information "a" of the traveling robot 1 itself, then it updates the self-localization probability density based on the motion information "a". Then, at each time, that one of the grids having the highest value of the self-localization probability density distribution is determined as an estimation result of the self-localization.

For example, in a two-dimensional working space, grids (x, y) are provided in a substantially equidistantly spaced relationship from each other, and the probability p(l) with which the robot exists is managed for the position l (localization) of each grid. The presence probability p(l) is updated in response to an input of a movement (move) of the robot, that is, the internal observation information "a", and observation of a landmark, that is, the external observation information "s".

The presence probability p(l) relies upon a presence probability p(l') in a preceding state of the robot, that is, a preceding self-localization l', and a transition probability p(l|a, l') with which the state l is entered when a motion a is performed in the preceding state l'. In particular, if the products of the probabilities p(l') with which the states l' are individually entered and the transition probabilities (l|a, l') with which the states l are individually entered when a motion a is performed in the states l' are successively added (or integrated), the resulting sum converges into the presence probability p(l) with which the state of the traveling robot 1 at present, that is, the self-localization l, is reached. Accordingly, if a motion a of the robot as the external observation result is observed, then the presence probability p(l) of the robot at each grid can be updated in accordance with the following expression:

$$p(l) \leftarrow \sum_{l'} p(l \mid a, l') p(l') \quad (1)$$

On the other hand, the presence probability p(l) with which the robot exists in the state, that is, at the self-localization l, relies upon the presence probability p(l) and the transition probability p(s|l) with which the robot observes a landmark when the robot is in the state l. Accordingly, if observation of a landmark, that is, external observation information "s", is inputted when the robot is in the state 1, then the presence probability p(l) of the robot can be updated in accordance with the following expression. It is to be noted that, for the normalization, the product of the presence probability p(l) and the transition probability p(s|l) on the right side of the expression is divided by the probability p(s) with which a landmark is observed.

$$p(l) \leftarrow \frac{p(s \mid l) p(l)}{p(s)} \quad (2)$$

Figure 3:
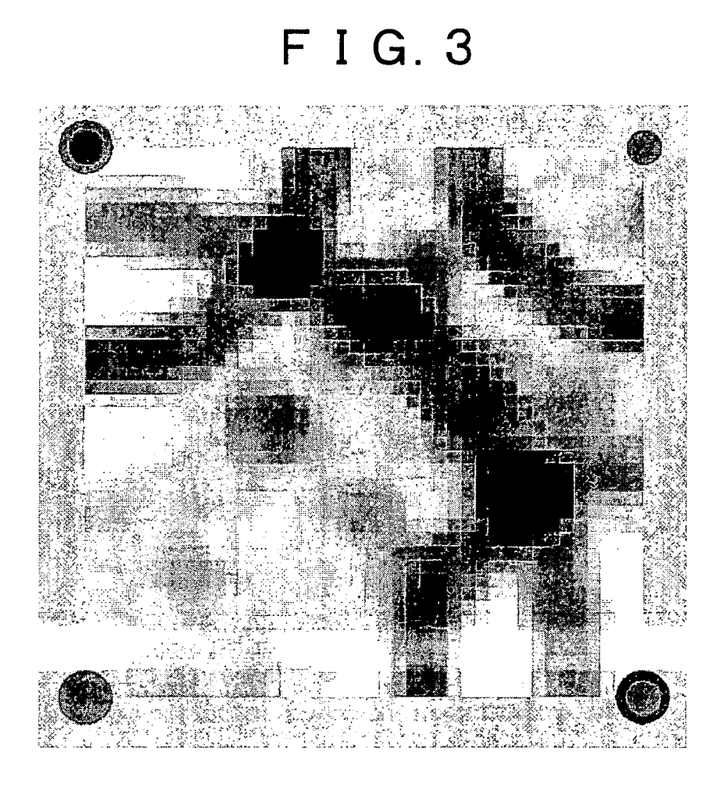
FIG. 3 is a view illustrating a self-localization probability density distribution on grids determined by the Markov localization.

FIG. 3 illustrates the self-localization probability density distribution on the grids determined by the Markov localization. In FIG. 3, the probability density at each grid is represented by a density in colors. A grid having the densest color, that is, a grid having the highest value of the self-localization probability density distribution, is determined as an estimation result of the self-localization.

The self-localization by the Markov localization is characterized principally in that it is robust against noise of a sensor, and although the accuracy of an identification solution is rough, the convergence speed of the solution is high.

On the other hand, the extended Kalman filter stores the self-localization as actually measured values of the state variables [x, y, θ] and estimates, if it observes a landmark provided in the environment, the self-localization based on the relative position from the landmark. Further, if the extended Kalman filter observes motion information of the traveling robot 1, then it performs estimation of the state amount based on the motion information.

Figure 4:
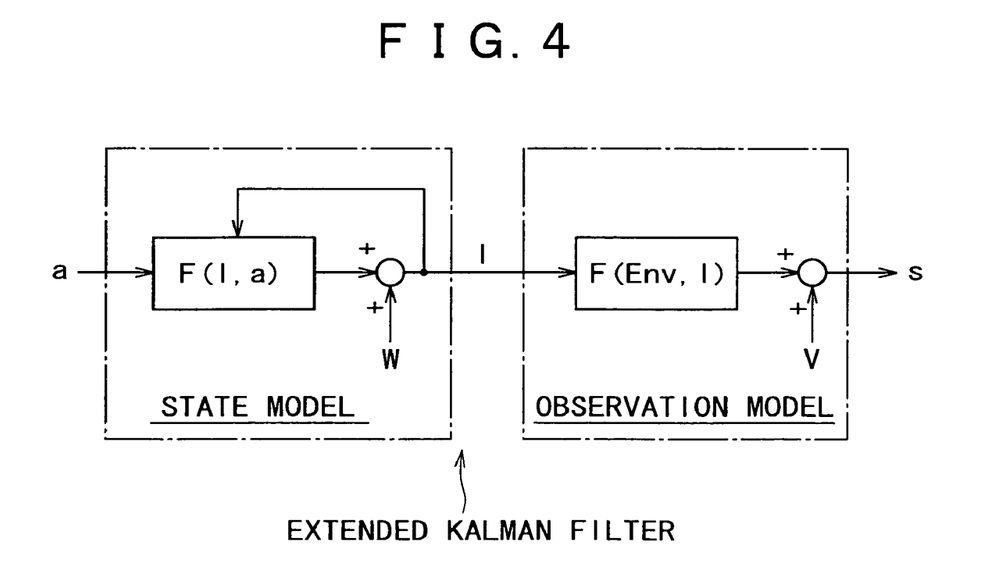
FIG. 4 is a view schematically showing a configuration of an extended Kalman filter.

FIG. 4 schematically shows a configuration of the extended Kalman filter. Referring to FIG. 4, the extended Kalman filter includes a state model defying a relationship between the motion information "a" of the robot itself and the state, that is, the self-localization l, and an observation model defying a relationship between the self-localization l and the observation information "s" of a landmark.

The state model includes a transition function F(l, a) that provides a theoretical state l when the robot performs a motion a in the state, that is, at the self-localization l. Since actually a noise component w is superposed on the theoretical state l, the state l of the robot converges as given by the following expression by the state model:

$$l \leftarrow F(l, a) + w \quad (3)$$

Meanwhile, the observation model includes an observation function H(Env, l) that provides a theoretical value s of observation regarding a certain known environment Env (for example, the position of a landmark) when the robot is in the state, that is, at the self-localization i. Since actually a noise component v is superposed on the theoretical value of observation, the observation value s converges as given by the following expression by the observation model:

$$s \leftarrow H(ENV, l) + v$$

It is to be noted that it is assumed here that the noises w and v superposed on the state l and the observation s respectively, have a Gaussian distribution whose median is zero.

In the extended Kalman filter including the state model, which defines a relationship between the motion information "a" of the robot itself and the self-localization l, and the observation model, which defines a relationship between the self-localization l and the observation information "s" of a landmark, as shown in FIG. 4, the motion information "a" is known as an internal observation result and the observation information "s" of a landmark is known as an external observation result. Accordingly, the self-localization of the robot can result in a problem that the state l of the robot is estimated from the motion information "a" of the robot and the observation information "s". Here, the motion a, state l, and observation s of the robot are represented individually as Gaussian distributions given below:

a: Gaussian distribution whose median is $\hat{a}$ and whose covariance is $\Sigma_a$ s: Gaussian distribution whose median is $\hat{s}$ and whose covariance is $\Sigma_s$ l: Gaussian distribution whose median is $\hat{l}$ and whose covariance is $\Sigma_l$     (5)

It is assumed that the state l of the robot at a certain point of time is estimated as a Gaussian distribution having a certain median and a certain covariance. In such an instance, when a motion a of the robot is observed, the median and the covariance regarding the estimated value of the state l can be updated in accordance with the following expressions:

$$\hat{l} \leftarrow F(\hat{l}, \hat{a})$$

$$\Sigma_l \leftarrow \nabla F_l \Sigma_l \nabla F_l^T + \nabla F_a \Sigma_a \nabla F_a^T \quad (6)$$

where

Jacobian matrix given by $\nabla F_l : \partial F / \partial l$

Jacobian matrix given by $\nabla F_a : \partial F / \partial a$     (7)

Similarly, if observation information "s" of a landmark is observed when the state l of the robot at a certain point of time is estimated as a Gaussian distribution having a certain median and a certain covariance, then the median and the covariance regarding the estimated value of the state l can be updated as given by the following expressions:

$$\hat{l} \leftarrow \hat{l} + W\hat{v}$$

$$\Sigma_l \leftarrow \Sigma_l - W \Sigma_v W^T \quad (8)$$

where

W: Kalman filter gain given by $$W = \sum_l \nabla H_l^T \Sigma_v^{-1}$$

Figure 5:
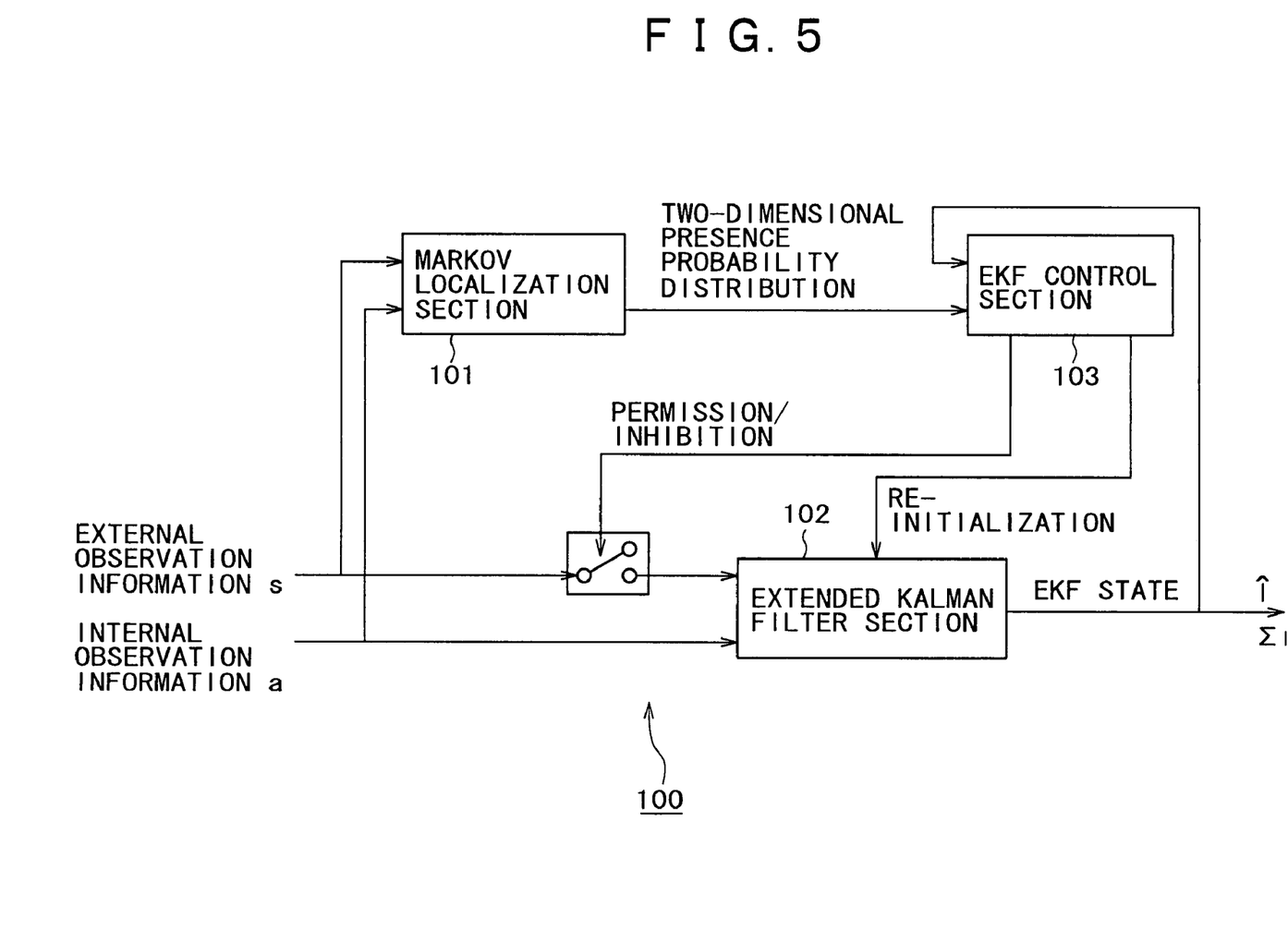
FIG. 5 is a view schematically showing a functional configuration of a self-localization system 100 according to a present embodiment using both of the Markov localization and the extended Kalman filter.

$\hat{v}$: median of the observation error of the landmark given by $\hat{v} = \hat{s} - H(ENV, \hat{l})$ $\Sigma_v$: covariance of the observation error of the landmark given by $\Sigma_v = \Sigma_s + \nabla H_l \Sigma_l \nabla H_l^T$ $\nabla H_l$: Jacobian matrix given by $\partial H / \partial l$ FIG. 5 schematically shows a functional configuration of the self-localization system 100 according to the present embodiment using both of the Markov localization and the extended Kalman filter. Referring to FIG. 5, the self-localization system 100 includes a Markov localization section (ML) 101, an extended Kalman filter section (EKF) 102, and an EKF control section 103 for controlling operation of the extended Kalman filter section 103.

The Markov localization section 101 stores the position of the robot itself in the working space as a self-localization probability density distribution on discrete grids, and receives external observation information "s" regarding observation of a landmark and internal observation information "a" regarding a motion of the robot itself as inputs thereto to update the self-localization probability density distribution. Then, at each time, the Markov localization section 101 outputs that one of the grids having the highest value of the self-localization probability density distribution as an estimation result of the self-localization to the EKF control section 103.

The extended Kalman filter section 102 includes a state model, which defines a relationship between the motion information "a" and the state, that is, the self-localization l of the robot itself, and an observation model, which defines a relationship between the self-localization l and observation information "s" of a landmark. The extended Kalman filter section 102 considers the self-localization of the robot as a problem that the state l of the robot is estimated based on the motion information "a" and the observation information "s" of the robot and estimates the state l of the robot at a certain point of time as a Gaussian distribution having a certain median and a certain covariance. Then, if a motion a of the robot is observed, then the extended Kalman filter section 102 updates the median and the covariance regarding the estimated value of the state l in accordance with the expressions (6) given hereinabove. On the other hand, if observation information "s" of a landmark is observed, then the extended Kalman filter section 102 updates the median and the covariance regarding the estimated value of the state l in accordance with the expressions (8) given hereinabove. Since the extended Kalman filter is superior in the robustness against a decrease of sensor information, the estimation result of the extended Kalman filter section 102 is determined as an output of the entire system 100.

The EKF control section 103 controls operation of the extended Kalman filter section 103 in response to the output result of the Markov localization section 101. More particularly, the EKF control section 103 verifies the validity regarding the observation information "s" of a landmark based on the self-localization estimation result of the Markov localization section 101. The validity of the observation information "s" can be discriminated depending upon whether or not the probability p(s|mlp) with which the Markov localization section 101 observes a landmark at the grid position "mlp" at which the presence probability is highest exceeds a predetermined threshold value parameter $\text{thresh}_{obs}$.

If the probability p(s|mlp) with which the Markov localization section 101 observes a landmark at the grid position "mlp" is lower than the predetermined threshold value parameter $\text{thresh}_{obs}$, then it is inferred that even the Markov localization section 101, which is robust against sensor noise, does not exhibit sufficient convergence of the identification solution due to sensor noise. In such an instance, even if the extended Kalman filter section 102, which is poor in the robustness against sensor noise, estimates the self-localization, a solution having a high accuracy cannot be obtained, and rather, only time for arithmetic operation is wasted. Therefore, if it is discriminated that the observation information "s" is not valid, then a switch 104 is used to intercept the input of the external observation information "s", that is, observation information of a landmark, to the extended Kalman filter section 102 to stop updating of the self-localization estimated value in the extended Kalman filter section 102.

The EKF control section 103 also verifies the validity of the self-localization estimation result of the extended Kalman filter section 102. The validity of the self-localization estimation result can be determined by a distribution comparison test with the presence probability p(l) outputted from the Markov localization section 101 by using the estimated median and covariance of the state l. An example of the distribution comparison test is a chi-square-test.

If the distribution comparison test reveals that the probability distributions of the Markov localization section 101 and the extended Kalman filter section 102 are not similar to each other, then it can be determined that the self-localization estimated value of the extended Kalman filter section 102, which is lower in the robustness against sensor noise, is not valid due to an influence of sensor noise. In such an instance, the EKF control section 103 performs re-initialization of the extended Kalman filter section 102. This is because the extended Kalman filter requires much time for resetting.

Figure 6:
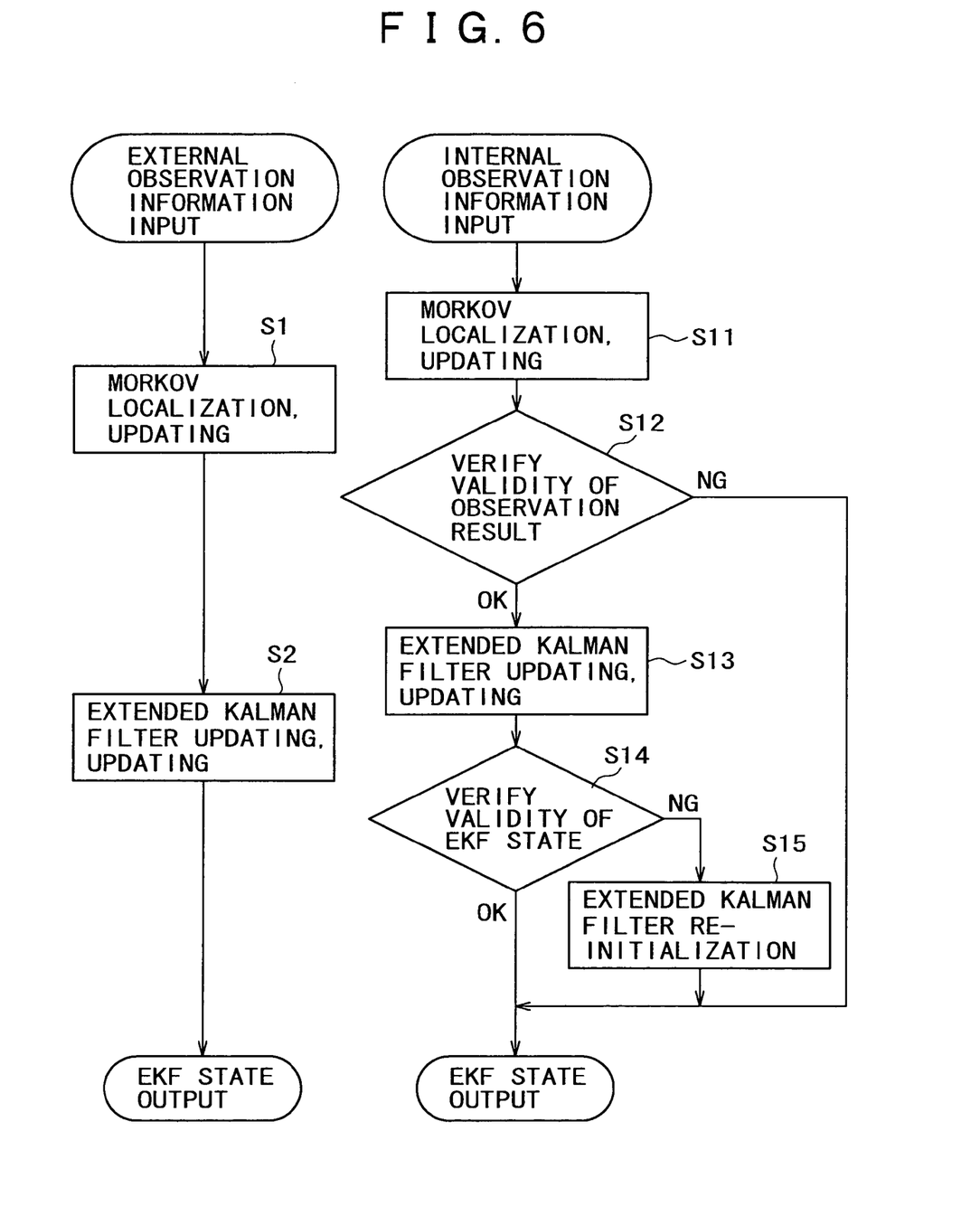
FIG. 6 is a flow chart illustrating an operation characteristic of the self-localization system 100.

FIG. 6 illustrates operation characteristics of the self-localization system 100 in the form of flow charts.

If internal observation information "a" regarding a movement of the robot 1 is inputted to the self-localization system 100, then the Markov localization section 101 first performs an updating process of the self-localization estimated value using the expression (1) given hereinabove (step S1). Then, the extended Kalman filter section 102 performs an updating process of the self-localization estimated value using the expressions (6) given hereinabove (step S2).

On the other hand, if external observation information "s" regarding observation of a landmark is inputted to the self-localization system 100, then the Markov localization section 101 first performs an updating process of the self-localization estimated value using the expression (2) given hereinabove (step S11).

An output result of the Markov localization section 101 is inputted to the EKF control section 103, by which the validity of the observation information "s" is verified (step S12). The validity of the observation information "s" can be determined depending upon whether or not the probability p(s|mlp) with which the Markov localization section 101 observes a landmark at the grid position "mlp" at which the presence probability is highest exceeds the predetermined threshold value parameter $thresh_{obs}$.

If the probability p(s|mlp) with which the Markov localization section 101 observes a landmark at the grid position "mlp" is lower than the predetermined threshold value parameter $thresh_{obs}$, then it is inferred that even the Markov localization section 101, which is robust against sensor noise, does not exhibit sufficient convergence of the identification solution due to sensor noise. In such an instance, even if the extended Kalman filter section 102, which is poor in the robustness against sensor noise, estimates the self-localization, a solution having a high accuracy cannot be obtained, and rather, only time for arithmetic operation is wasted. Therefore, if it is discriminated that the observation information "s" is not valid, then the switch 104 is used to intercept the input of the external observation information "s", that is, observation information of a landmark, to the extended Kalman filter section 102 to stop updating of the self-localization estimated value in the extended Kalman filter section 102.

On the other hand, if a result of the verification of the observation information "s" indicates that the validity is satisfied, that is, the probability p(s|mlp) with which the Markov localization section 101 observes a landmark at the grid position "mlp" exceeds the predetermined threshold value parameter $thresh_{obs}$, the extended Kalman filter section 102 further performs an updating process using the expressions (8) given hereinabove (step S13).

A result of the self-localization estimation by the extended Kalman filter section 102 is inputted to the EKF control section 103, by which the validity of it is verified (step S14). The validity of the self-localization estimation result by the extended Kalman filter section 102 can be discriminated by a distribution comparison test with the presence probability p(l) outputted from the Markov localization section 101 by using the estimated median and covariance of the state l. An example of the distribution comparison test is a chi-square-test.

If the distribution comparison test reveals that the probability distributions of the Markov localization section 101 and the extended Kalman filter section 102 are not similar to each other, then it can be determined that the self-localization estimated value of the extended Kalman filter section 102, which is lower in the robustness against sensor noise, is not valid due to an influence of sensor noise. In such an instance, the EKF control section 103 performs re-initialization of the extended Kalman filter section 102 (step S15). This is because the extended Kalman filter requires much time for resetting.

Finally, experiment examples in a case wherein each of the Markov localization and the extended Kalman filter is applied by itself to perform self-localization and another case wherein the Markov localization and the extended Kalman filter are used in combination in accordance with the present invention to perform self-localization are compared and verified. It is to be noted here that six landmarks are disposed at different locations in the working space of a field size of 3×2 m, and the total measurement time is 58 minutes, the number of landmark observations (that is, the number of times by which observation information "s" is inputted) is 48,636, and the robot motion step number (that is, the number of times by which motion information "a" is inputted) is 8,334.

Figure 7:
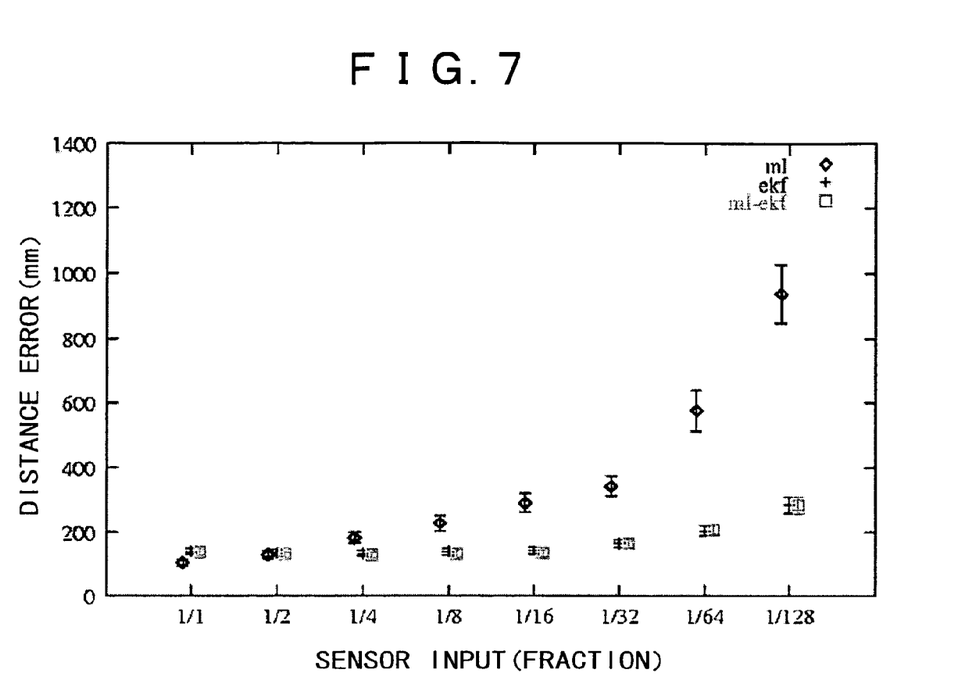
FIG. 7 is a view illustrating comparison verification results regarding an increase of errors involved in a decrease of a sensor input (regarding the identification accuracy of a solution) in cases wherein the Markov localization and the extended Kalman filter are individually applied by themselves to perform self-localization and another case wherein the Markov localization and the extended Kalman filter are used in combination to perform self-localization in accordance with the present invention.

In FIG. 7, the axis of abscissa indicates the number of sensor inputting times, and the axis of ordinate indicates the observation error. FIG. 7 illustrates comparison and verification with regard to the robustness against a reduction of sensor information in cases wherein the Markov localization and the extended Kalman filter are individually applied by themselves to perform self-localization and another case wherein the Markov localization and the extended Kalman filter are used in combination to perform self-localization in accordance with the present invention.

Where the extended Kalman filter is applied by itself and where the Markov localization and the extended Kalman filter are used in combination to perform self-localization in accordance with the present invention, even if the number of sensor inputting times decreases, the observation error does not exhibit a significant variation. In contrast, where the Markov localization is applied by itself, the observation error exhibits a significant increase as the number of sensor inputting times decreases. Accordingly, it can be recognized that the extended Kalman filter is high in the robustness against a decrease of sensor information, and where the number of times of observation is small, the extended Kalman filter can achieve self-localization of a higher accuracy than the Markov localization.

Figure 8:
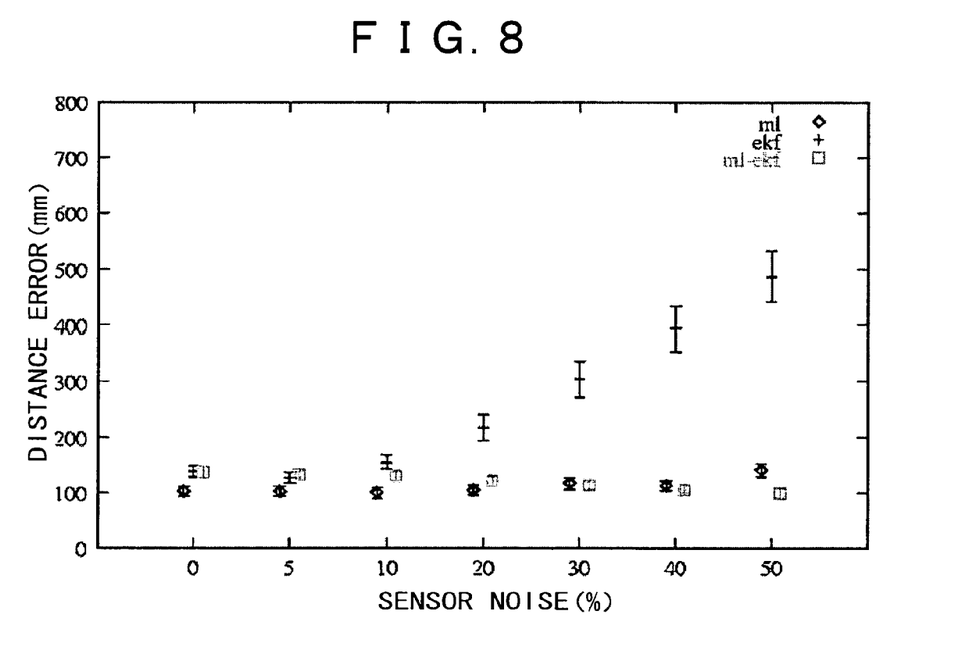
FIG. 8 is a view illustrating comparison verification results regarding an increase of errors involved in an increase of sensor noise (regarding the robustness against observation noise) in cases wherein the Markov localization and the extended Kalman filter are individually applied by themselves to perform self-localization and another case wherein the Markov localization and the extended Kalman filter are used in combination to perform self-localization in accordance with the present invention.

Meanwhile, in FIG. 8, the axis of abscissa indicates the sensor noise ratio, and the axis of ordinate indicates the observation error. FIG. 8 illustrates comparison and verification with regard to the robustness against sensor noise in cases wherein the Markov localization and the extended Kalman filter are individually applied by themselves to perform self-localization and another case wherein the Markov localization and the extended Kalman filter are used in combination to perform self-localization in accordance with the present invention.

Where the Markov localization is applied by itself and where the Markov localization and the extended Kalman filter are used in combination to perform self-localization in accordance with the present invention, even if the sensor noise increases, the observation error does not exhibit a significant variation. In contrast, where the extended Kalman filter is applied by itself, the observation error exhibits a significant increase as the sensor noise increases. Accordingly, it can be recognized that the Markov localization is high in the robustness against sensor noise, and where there is much sensor noise, the Markov localization can achieve self-localization of a higher accuracy than the extended Kalman filter.

Figure 9:
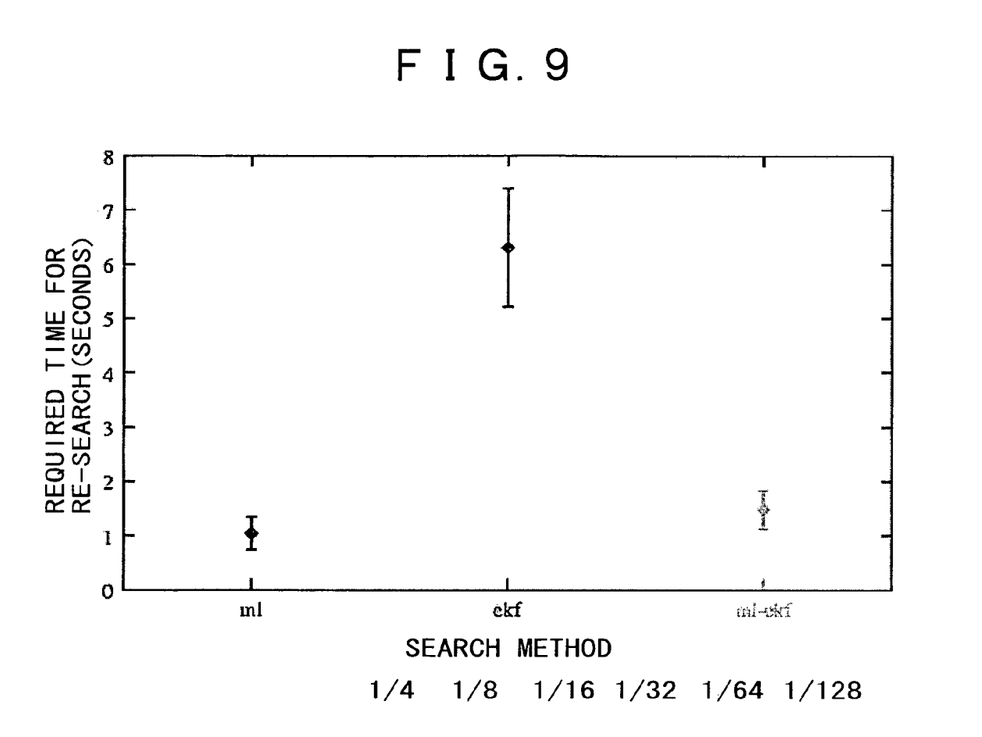
FIG. 9 is a view illustrating comparison verification results regarding the convergence speed of a solution in cases wherein the Markov localization and the extended Kalman filter are individually applied by themselves to perform self-localization and another case wherein the Markov localization and the extended Kalman filter are used in combination to perform self-localization in accordance with the present invention.

FIG. 9 illustrates comparison and verification with regard to the time required for resetting in cases wherein the Markov localization and the extended Kalman filter are individually applied by themselves to perform self-localization and another case wherein the Markov localization and the extended Kalman filter are used in combination to perform self-localization in accordance with the present invention.

Where the Markov localization is applied by itself and where the Markov localization and the extended Kalman filter are used in combination to perform self-localization in accordance with the present invention, the time required for resetting is comparatively short. In contrast, where the extended Kalman filter is applied by itself, considerably long time is required for resetting. Accordingly, when resetting is required, preferably the Markov localization is applied. Further, if the extended Kalman filter is used, then preferably re-initialization is performed rather than resetting.

As can be seen also from FIGS. 7 to 9, it can be said that the technique of using the Markov localization and the extended Kalman filter in combination in accordance with the present invention to perform self-localization succeeds good performances of both of the Markov localization and the extended Kalman filter.

Supplement

The present invention has been described in detail above with reference to a particular embodiment. It is apparent, however, that those skilled in the art can modify or alter the embodiment without departing from the scope and the spirit of the present invention. In other words, the present invention has been disclosed in the form of illustration and shall not be interpreted restrictively. The scope of the invention is therefore to be determined by the appended claims.

INDUSTRIAL APPLICABILITY

According to the present invention, a superior self-localization system and self-localization method for a robot can be provided by which high-speed robust self-localization with a high degree of accuracy can be performed for the robot, which includes a moving mechanism such as wheels or movable legs and behaves while it recognizes the position or the posture of the robot itself.

Further, according to the present invention, a superior self-localization system and self-localization method for a robot can be provided by which the self-localization can be suitably performed by using a result of a search of a landmark in an environment including an artificial landmark as a clue.

Furthermore, according to the present invention, a superior self-localization system and self-localization method for a robot can be provided by which both of a global search, which searches in a comparatively short period of search time over a wide range, and a local search, which requires much search time although the search accuracy is high, can be used to achieve high-speed and robust self-localization with a high degree of accuracy.

The invention claimed is:

1. A self-localization system for a robot that includes a moving mechanism and can travel in an environment comprising:

external observation means for observing a landmark provided in the environment;

internal observation means for observing motion information of said robot;

first search means for outputting a localization solution at a comparatively high speed based on a result of the external observation and a result of the internal observation;

second search means for outputting a localization solution with a comparatively fine accuracy based on the external observation result and the internal observation result; and control means for controlling the operation of said second search means in response to the output result of said first search means.

2. A self-localization system for a robot according to claim 1, wherein said first search means applies Markov localization to store the position of said robot in the environment as a self-localization probability density distribution on discrete grids, and estimates the self-localization based on a relative position of said robot from the landmark in response to the observation result of the landmark by said external observation means to update the self-localization probability density distribution, updates the self-localization probability density based on the observation result of the motion information of said robot by said internal observation means, and outputs that one of said grids having the highest value of the self-localization probability density distribution at each time as an estimation result of the self-localization.

3. A self-localization system for a robot according to claim 2, wherein said second search means applies an extended Kalman filter including a state model, which defines a relationship between the motion information of said robot by said internal observation means and the self-localization, and an observation model, which defines a relationship between the self-localization and the observation information of the landmark by said external observation means, to estimate the self-localization based on the motion information of said robot by said internal observation means and the observation information of the landmark by said external observation means.

4. A self-localization system for a robot according to claim 3, wherein
said control means compares the estimation result of the self-localization by said second search means with the estimation result of the self-localization by said first search means to verify the validity of the estimation result of the self-localization by said second search means and outputs the search result of the self-localization by said second search means as the self-localization result in response to a fact that the evaluation satisfies a predetermined reference, but re-initializes said second search means in response to another fact that the evaluation does not satisfy the predetermined reference.

5. A self-localization system for a robot according to claim 4, wherein
said control means evaluates that the output result of said second search means is not valid when the similarity of the self-localization estimation results of said first search means and said second search means is low.

6. A self-localization system for a robot according to claim 2, wherein
said control means evaluates the validity of the external observation result by said external observation means based on a probability with which the landmark is observed by said external observation means at the self-localization estimated by said first search means and limits inputting the external observation result to said second search means in response to a fact that the evaluation does not satisfy a predetermined reference.

7. A self-localization system for a robot according to claim 1, wherein
said control means evaluates the validity of the external observation result by said external observation means based on the search result by said first search means and limits inputting the external observation result to said second search means in response to a fact that the evaluation does not satisfy a predetermined reference.

8. A self-localization system for a robot according to claim 1; wherein
said control means verifies the validity of the search result by said second search means and outputs the search result as the self-localization result in response to a fact that the evaluation satisfies a predetermined reference, but re-initializes said second search means in response to another fact that the evaluation does not satisfy the predetermined reference.

9. A self-localization system for a robot according to claim 1, wherein
said external observation means includes image inputting means for capturing the landmark and image recognition means for recognizing the landmark and the distance to the landmark based on an input image from said image inputting means.

10. A self-localization system for a robot according to claim 1, wherein
said external observation means includes a range finder for measuring the distance to the landmark.

11. A self-localization system for a robot according to claim 1, wherein
the landmark has visually discernible identification information formed on a surface thereof.

12. A self-localization method for a robot that includes a moving mechanism and can travel in an environment comprising:
an external observation step of observing a landmark provided in the environment;
an internal observation step of observing motion information of said robot;
a first search step of outputting a localization solution at a comparatively high speed based on a result of the external observation and a result of the internal observation;
a second search step of outputting a localization solution with a comparatively fine accuracy based on the external observation result and the internal observation result; and
a control step of controlling the operation of the second search means in response to the output result of the first search means.

13. A self-localization method for a robot according to claim 12, wherein
the first search step applies Markov localization to store the position of said robot in the environment as a self-localization probability density distribution on discrete grids, and estimates the self-localization based on a relative position of said robot from the landmark in response to the observation result of the landmark by the external observation step to update the self-localization probability density distribution, updates the self-localization probability density based on the observation result of the motion information of said robot by the internal observation step, and outputs that one of said grids having the highest value of the self-localization probability density distribution at each time as an estimation result of the self-localization.

14. A self-localization method for a robot according to claim 13, wherein
the control step evaluates the validity of the external observation result by the external observation step based on a probability with which the landmark is observed by the external observation step at the self-localization estimated by the first search step and limits inputting the external observation result to the second search step in response to a fact that the evaluation does not satisfy a predetermined reference.

15. A self-localization method for a robot according to claim 12, wherein
the second search step applies an extended Kalman filter including a state model, which defines a relationship between the motion information of said robot by the internal observation step and the self-localization, and an observation model which, defines a relationship between the self-localization and the observation information of the landmark by the external observation step, to estimate the self-localization based on the motion information of said robot by the internal observation step and the observation information of the landmark by the external observation step.

16. A self-localization method for a robot according to claim 15, wherein
the control step compares the estimation result of the self-localization by the second search step with the estimation result of the self-localization by the first search step to verify the validity of the estimation result of the self-localization by the second search step and outputs the search result of the self-localization by the second search step as the self-localization result in response to a fact that the evaluation satisfies a predetermined reference, but re-initializes the second search step in response to another fact that the evaluation does not satisfy the predetermined reference.

17. A self-localization method for a robot according to claim 16, wherein
the control means evaluates that the output result of the second search step is not valid when the similarity of the self-localization estimation results of the first search step and the second search step is low.

18. A self-localization method for a robot according to claim 12, wherein
the control step evaluates the validity of the external observation result by the external observation step based on the search result by the first search step and limits inputting the external observation result to the second search step in response to a fact that the evaluation does not satisfy a predetermined reference.

19. A self-localization method for a robot according to claim 12, wherein
the control step verifies the validity of the search result by the second search step and outputs the search result as the self-localization result in response to a fact that the evaluation satisfies a predetermined reference, but re-initializes the second search step in response to another fact that the evaluation does not satisfy the predetermined reference.

* * * * *